Feb. 13, 1940. J. HALTENBERGER Re. 21,348

INDEPENDENT WHEEL STEERING

Original Filed Nov. 9, 1936

Inventor

Jules Haltenberger

Reissued Feb. 13, 1940

Re. 21,348

UNITED STATES PATENT OFFICE 21,348

INDEPENDENT WHEEL STEERING

Jules Haltenberger, Ann Arbor, Mich.

Original No. 2,096,542, dated October 19, 1937, Serial No. 109,835, November 9, 1936. Application for reissue May 16, 1939, Serial No. 274,074

10 Claims. (Cl. 280—95)

My invention relates to independent wheel steering and independent wheel suspension for an automobile, and the present application is a continuation-in-part of my copending patent application for Vehicle suspension Serial No. 697,242, filed Nov. 9, 1933.

It is the object of my invention to provide a simple and inexpensive steering connection between a pair of associated independently suspended wheels and a materially transversely offset steering lever, while retaining a good steering geometry.

A further object is to eliminate the reach-rod and center arm now in general use with materially offset steering, and using a pair of not too varied lengths of tie-rods to retain a good steering geometry.

A further object is to provide a two unit interconnected steering mechanism and similar character front axle. Further objects of my invention will appear as the description proceeds.

Figure 1:
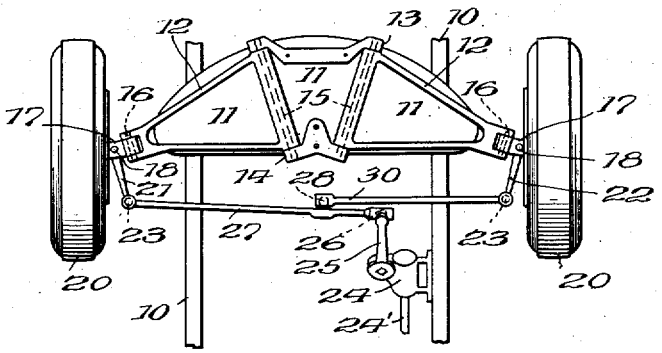
Figure 2:
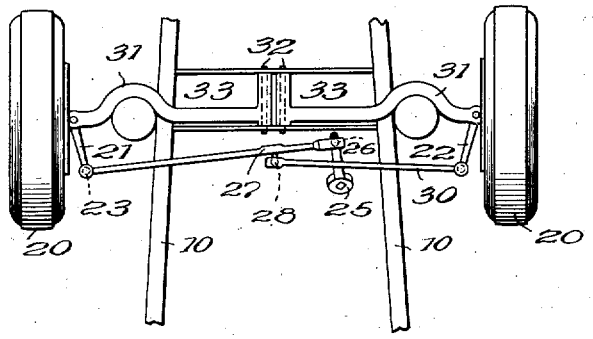
Figure 3:
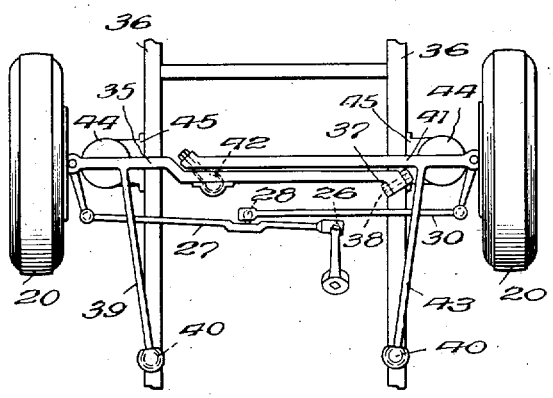

The accompanying drawing illustrates my invention. Here Fig. 1 is a bottom view of the fore part of an automobile illustrating part of a known independent wheel suspension and the proposed steering mechanism; Fig. 2 is a modification of the suspension and a modification of the assembly of the steering mechanism; Fig. 3 is a steering mechanism illustrated in Fig. 1 and applied to a long-hinged interconnected front axle.

Referring to the construction illustrated in Fig. 1 it will be seen that frame side rails 10 are connected by a wide cross member 11 arranged to support a pair of wishbone type lower links 12 as by brackets 13 and 14 and hinge pins 15 respectively. Lower links 12 at their outer ends as by link pins 16 support the vertical links 17 carrying kingbolts 18 and supporting steerable front wheels 20. To the usual spindles (not shown) of these wheels are attached tie-rod arms 21 and 22 and they are provided with the usual ball and socket connections 23 at their ends.

Lower links 12, vertical links 17 and a pair of upper links (not shown) form the independent wheel supporting link parallelograms as produced and sold by a great number of automobile manufacturers. It will be noted that in this construction the continuations of the center line of hinge pins 15 form a forwardly open angle and meet substantially in the transverse center of the automobile.

A side rail 10 supports the usual steering chuck 24 and usual transversely materially offset steering lever 25 provided at its end with the customary ball and socket joint 26. This steering lever and tie-rod arm 21 are connected by a primary tie-rod 27 and by joints 26 and 23 respectively. The primary tie-rod intermediate its ends is provided with a ball and socket joint 28 for a secondary tie-rod 30, thereby interconnecting tie-rod 27 and tie-rod arm 22 and its joint 23 respectively, making the steering operative.

Steering lever 25 is operated by a usual steering shaft 24′ and usual steering wheel thereon (not shown).

It is important to note that the steering lever is positively to one side (as in all automobiles manufactured in the United States). By connecting the secondary tie-rod to the primary at a point intermediate its ends the secondary rod is lengthened, making the two rods more equal in length for good steering geometry.

It is also to be noted that as the continuation of the center lines of hinge pins 15 meet substantially at the primary tie-rod, therefore as far as the tie-rod construction is concerned this wheel suspension should be considered as a substantially center hinged design.

The above described steering mechanism is not limited to the open angle link parallelogram nor to a steering lever position entirely to the rear of the rods, and a modification is illustrated in Fig. 2. Here substantially center-hinged half axles 31 support the steerable wheels 20 as by hinge bolts 32 in wide cross member 33, a construction used on some European automobiles. For simplicity of presentation all numerals are duplicated. As is clear from the drawing, here steering lever 25 is moved forward with its joint 26 in front of secondary tie-rod 30.

The steering mechanism was described in connection with Fig. 1. Here, however, these parts are assembled in a reversed position. The connection 28 is substantially in the transverse center of the automobile.

Since the specific spring means which space the independently suspended wheels from the frames in Figs. 1 and 2 do not form part of the invention for simple presentation they are omitted.

Fig. 3 illustrates a long-hinged independently suspended front axle construction. In character it is like the steering mechanism described in connection with Figs. 1 and 2. Here a primary part axle 35 supports a steerable wheel 20 in the usual manner. Part axle 35 is supported on a frame side rail 36 by a bracket 37 and hinge bolts 38 respectively. Integral with the part axle is a rearwardly extending arm 39 terminating in a ball and socket joint 40 aligned with hinge bolts 38.

A secondary part axle 41 is fulcrumed to the primary by a ball and socket joint 42. Its rearwardly extending arm 43, terminating in a ball and socket joint 40, is secured to the frame side rail 36.

The steering mechanism was described in connection with Fig. 1. It will be noted that when the automobile is in normal position the hinge axis center line of the primary unit substantially passes through the ball and socket joint 26. The hinge axis of the secondary unit passes substantially through the ball and socket joint 28. This axle construction by the long hinging and diagonal axis of the wheel supporting units reduces the tread variation to a desired minimum and permits each wheel to oscillate separately without affecting the steering. This front wheel construction is simple and inexpensive.

Both the primary part axle 35 and secondary part axle 41 are provided with spring seats 44 and above them similar shaped spring seats 45 are mounted on frame side rails 36.

Between these associated seats are placed the coil springs (not shown) that space the wheels from the frame.

What I claim as my invention is:

1. In an automobile, a frame, independently suspended steerable wheels thereon, a steering lever materially offset on said frame, a primary rod connecting said lever to one of said wheels, a secondary rod on said primary rod intermediate the ends thereof and connected to the other of said wheels and means to operate said lever.

2. In an automobile, a frame, independently suspended steerable wheels thereon, a steering lever materially offset on said frame, a primary rod connecting said lever to one of said wheels, a secondary rod with a connection normally substantially in the transverse center of the automobile on said primary rod and connected to the other of said wheels and means to operate said lever.

3. In an automobile, a frame, steerable wheels independently suspended on diagonally disposed center-lines thereon, a steering lever at one side on said frame, a pair of interconnected rods between said wheels and lever, the interconnection between said rods being positioned intermediate the ends on one of said rods and at the end of the other of said rods and means to operate said lever.

4. In an automobile, a frame, a primary long hinged part axle on said frame supporting a steerable wheel having a tie rod arm, a secondary hinged part axle on said primary part axle supporting a steerable wheel having a tie rod arm, a steering lever on said frame, a pair of different length tie rods connecting said steering lever to said tie rod arms, said connections normally substantially in the hinge axes of said part axles, and means to operate said steering lever.

5. In an automobile, a frame, a primary long hinged part axle on said frame supporting a steerable wheel having a tie rod arm, a secondary hinged part axle on said primary part axle supporting a steerable wheel having a tie rod arm, a steering lever on said frame, steering rods connecting said lever and said tie rod arms, and means to operate said steering lever.

6. In a road vehicle, steerable road wheels, a steering column assembly offset to one side of the longitudinal center line of the vehicle, a long link swivelly jointed at opposite ends to said assembly and to the wheel on the other side of the longitudinal center line of the vehicle, and a short link swivelly jointed at opposite ends to the other wheel and to the long link at a point near the longitudinal center line of the vehicle.

7. In a motor vehicle, a pair of transversely spaced road wheels, a steering member positioned in the space between said wheels, a pair of transversely extending tie rods having their inner end portions in transversely overlapping relation, means connecting the inner end of one of said rods to said steering member, means joining the inner end of the other rod to an intermediate portion of the first mentioned rod, and means joining the remote ends of said rods to said wheels respectively.

8. A motor vehicle comprising a frame, independently suspended steerable wheels arranged to swing about substantially horizontally disposed convergently related axes, steering mechanism for said wheels including interconnected rods joining said wheels, the interconnection between said rods being positioned normally at substantially the point of convergence of said axes, and being so constructed and arranged that the inner end of one of said rods is supported by an intermediate portion of the other of said rods, and means controlling the movement of said rods for steering said wheels.

9. In an automobile, a frame, independently suspended steerable wheels thereon, a steering lever materially offset on said frame, a transversely extending rod at one end on said steering member, means connecting said rod to said wheels, including a rod connected at its outer end to one of said wheels and at its inner end joining an intermediate portion of said first mentioned rod, and means to operate said steering member.

10. In a motor vehicle, a pair of transversely spaced steerable wheels, a steering member positioned in the space between said wheels, a transversely extending rod at one end carried by said steering member, means connecting said rod to said wheels, including a rod connected at its outer end to one of said wheels and at its inner end joining an intermediate portion of said first mentioned rod, and means to operate said steering member.

JULES HALTENBERGER.